US010915609B2

(12) United States Patent
Porcelli et al.

(10) Patent No.: US 10,915,609 B2
(45) Date of Patent: Feb. 9, 2021

(54) SECURING APPLICATIONS ON MOBILE DEVICES (71) Applicant: LAKEBA TECHNOLOGY PTY LTD, New South Wales (AU)

(72) Inventors: Giuseppe Porcelli, New South Wales (AU); Aatral Arasu Ramakrishnan, Coimbatore (IN)

(73) Assignee: LAKEBA TECHNOLOGY PTY LTD

( * ) Notice: Subject to any disclaimer, the term of this patent is extended or adjusted under 35 U.S.C. 154(b) by 195 days.

(21) Appl. No.: 16/052,585

(22) Filed: Aug. 1, 2018

(65) Prior Publication Data

US 2019/0042713 A1 Feb. 7, 2019

Related U.S. Application Data (60) Provisional application No. 62/539,882, filed on Aug. 1, 2017.

(51) Int. Cl.
| | |
|---|---|
| *G06F 11/30* | (2006.01) |
| *G06F 12/14* | (2006.01) |
| *G06F 21/14* | (2013.01) |
| *G06F 21/64* | (2013.01) |
| *H04L 9/32* | (2006.01) |
| *G06F 21/54* | (2013.01) |
| *G06F 21/56* | (2013.01) |
| *G06F 21/12* | (2013.01) |

(Continued)

(52) U.S. Cl.
CPC ............ *G06F 21/14* (2013.01); *G06F 21/121* (2013.01); *G06F 21/54* (2013.01); *G06F 21/566* (2013.01); *G06F 21/64* (2013.01); *H04L 9/3263* (2013.01); *G06F 8/53* (2013.01); *G06F 8/61* (2013.01); *G06F 2221/033* (2013.01); *G06F 2221/0748* (2013.01)

(58) Field of Classification Search
CPC ........ G06F 21/14; G06F 21/121; G06F 21/64; G06F 21/54; G06F 21/566; G06F 2221/0748; G06F 8/53; G06F 8/61; G06F 2221/033; H04L 9/3263
See application file for complete search history.

(56) References Cited

U.S. PATENT DOCUMENTS

7,287,166 B1 10/2007 Chang et al.
8,549,656 B2 10/2013 Blaisdell et al.
(Continued)

*Primary Examiner* — Trong H Nguyen
(74) *Attorney, Agent, or Firm* — Fresh IP PLC; Clifford D. Hyra; Aubrey Y. Chen (57) ABSTRACT A system and methods for securing an application package of a software application prior to installation and during the usage of the software application on mobile device is disclosed. The system comprises an application server configured for communicating the application package to a security server. The security server comprises one or more modules for adding multiple layers of security into the application package prior to recompilation and installation on mobile device. Further, the security server is configured for monitoring the application during runtime on the mobile device for detecting any abnormal environment and/or malware. The security server further communicates an alert to the user of the mobile device, a developer at the application server and blocks the application from usage. Various other embodiments are disclosed herein.

12 Claims, 4 Drawing Sheets

(51) Int. Cl.
  *G06F 8/53* (2018.01)
  *G06F 8/61* (2018.01)

(56) References Cited

U.S. PATENT DOCUMENTS

| | | | |
|---|---|---|---|
| 8,875,298 B2 | 10/2014 | Li et al. | |
| 8,892,876 B1* | 11/2014 | Huang | G06F 21/6209 |
| | | | 713/165 |
| 10,356,087 B1* | 7/2019 | Vetter | H04L 9/0863 |
| 2002/0066022 A1* | 5/2002 | Calder | G06F 21/121 |
| | | | 726/26 |
| 2011/0179268 A1* | 7/2011 | Strom | H04L 67/34 |
| | | | 713/156 |
| 2012/0272072 A1* | 10/2012 | Lee | G06F 21/125 |
| | | | 713/190 |
| 2017/0235963 A1* | 8/2017 | Ahn | G06F 21/602 |
| | | | 713/190 |
| 2017/0286075 A1* | 10/2017 | Kaipu | G06F 8/41 |

\* cited by examiner

SECURING APPLICATIONS ON MOBILE DEVICES

This application claims priority to U.S. Provisional Application No. 62/539,882, filed on Aug. 1, 2017, which is incorporated herein by reference in its entirety.

FIELD OF INVENTION

The present subject matter relates to mobile device applications and in particular relates to system and methods for securing applications installed on mobile devices.

BACKGROUND

The smartphone has become a necessity for modern life. There are a number of platform-based smartphones available in the market including iOS, Android, Windows etc. The basic premise of platform based smartphones is to keep the user engaged by way of content such as mobile applications made available exclusively through the platform. For example, the Android platform for smartphones provides the users with an access to an application marketplace (Google Play) for all Android users to readily download and install any piece of software from among millions available on the platform. This configuration flexibility of mobile devices in recent times makes it a prime target for hackers and crackers.

There have been several instances where the platforms are used to deploy utility software along with malicious content to the mobile devices leading to data privacy breaches, financial frauds etc. It has become a necessity to provide secure means for any user to download, install, use and upgrade the software application that is devoid of any risks.

Few solutions in this regard, aim at only securing the application installation process. For example, Application object code is substituted with security program object code, thereby creating a security-wrapped app. In another example, as a part of policy-based application management, enterprise mobile application running on the mobile device has a policy through which it interacts with its environments for managing data sharing and environment.

Other examples of securing applications include security methods to convert the DEX file to secure DEX file, a proprietary compiled application code file format. The mobile applications may be secured by encrypting part or full DEX file into a secure DEX file.

Yet, there exists no measure, application or framework that takes care of the application runtime security, and prevents theft of source code and user data.

More specifically, In respect of a mobile-device application, there lies a need to prevent non-authorized entities from code theft, IP theft, access to user data, cracking the source code, decompilation of the application, modification of the application and/or debugging.

Accordingly, there exists a need for a mechanism to secure the applications installed on the mobile devices to overcome at least some of the problems cited above.

SUMMARY

This summary is provided to introduce a selection of concepts in a simplified version form that are further described below in the detailed description. This summary is not intended to identify key features or essential features of the invention, nor is it intended as an aid in determining the scope of the invention.

In one embodiment, a method for securing a mobile-device application is disclosed. The method comprising the steps of decompiling a file-package for a mobile-device application to extract class, methods and assets thereof; watermarking the extracted-class, methods and assets of the application to at least render unreadable; generating random strings for the class, methods and variables of a source-code with respect to the decompiled application; encrypting at least one of said source-code, data, string, assets pertaining to the application at the server in accordance with a randomly generated application-key; and storing said key along with at least one analogous-key in lower-layers of said file-package for causing generation of the original key from one or more analogous-keys as a part of decryption during the run-time.

In a further embodiment, the method comprises encrypting the assets of the application at the server using one or more pre-determined encryption criteria being at least one of AES, RSA encryption criteria.

In a further embodiment, the method comprises applying a debug-log removal criteria towards the source of code of the decompiled application to remove debug-logs for causing prevention of understanding the flow of the application while operation of the application in the debug mode.

In a further-embodiment, the method comprises: randomizing class and method of the source-code of the decompiled application at least through applying field-reflection and method-reflection.

In a further-embodiment, the method comprises removing unused library modules from the source-code with respect to the decompiled application.

In a further-embodiment, prior to recompiling the decompiled application, the method comprises: generating a checksum string with respect to the decompiled code to prevent any modification of the application as well as to invalidate any attempt to tamper application and launch/execution of the tampered application.

In another embodiment, the present subject matter illustrates a method for securing a mobile-device application during runtime, the method comprising the steps of detecting at least one of:
  rooting of the mobile-device;
  attachment of the mobile-device to a debugger;
  installation in an emulator;
communicating with a server and receiving a threat-level messages based on a risk to the mobile-device owing to said detection; and allowing or disallowing a usage of the application in the debuggable environment based on said received message and one or more of:
  a status of the application;
  absence of connection to internet;
  a level of risk associated with the operation in the debuggable environment as indicated by a security framework within the mobile-device.

Further aspects of the invention will be brought out in the following portions of the specification, wherein the detailed description is for the purpose of fully disclosing preferred embodiments of the invention without placing limitations thereon.

BRIEF DESCRIPTION OF DRAWINGS

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting. The term 'mobile application' refers to any software program configured to run on a mobile device. Also, the term 'application package' refers to any file format used by application developers and distributers for providing mobile device compatible installation of the mobile application.

Embodiments of the present disclosure will be described below in detail with reference to the accompanying figures.

Figure 1:
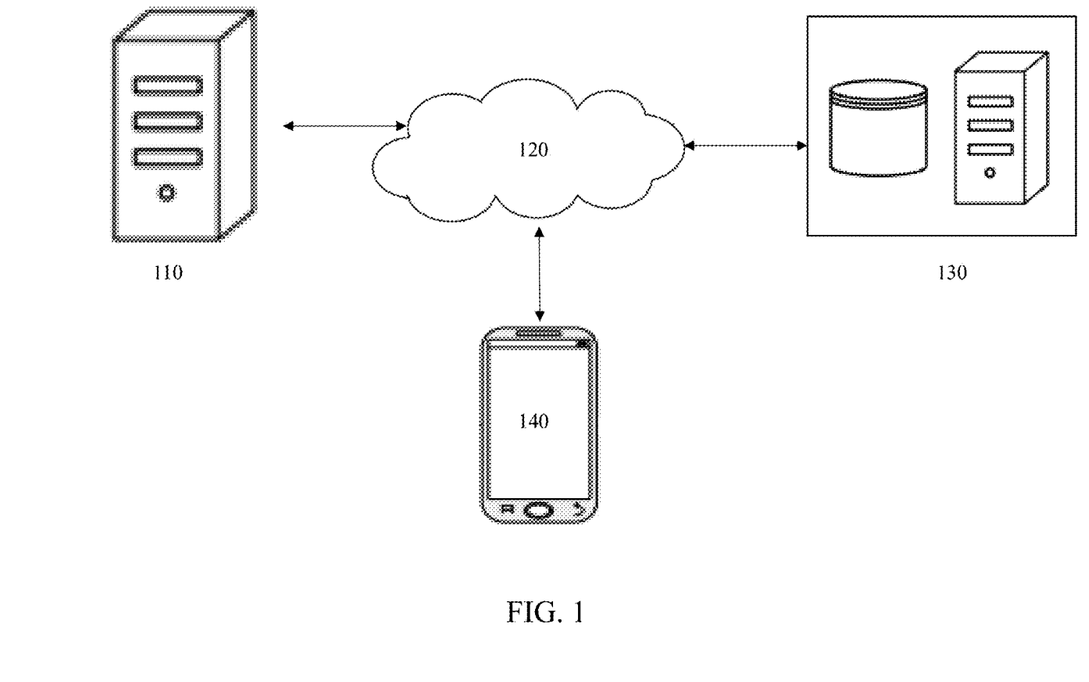
FIG. 1 illustrates an exemplary system that provides framework for securing the mobile applications, in accordance with an embodiment of the present disclosure.

With reference to FIG. 1, an exemplary system 100 that provides a framework for implementing methods for securing the mobile application during launch, run time and upgrade in accordance with embodiments of the present disclosure, is illustrated. The system 100 comprises an application server 110 communicating with a security server 130 and a mobile device 140 over a communication network 120. The application server 110, for example is operated and administered by an application developer to generate the application package as well as for providing an interface to allow the user associated with the mobile device 140 to download and install the application package for using the mobile application. In some examples, the application server 110 acts as a 'marketplace' aggregator of mobile applications from several developers, whereas in some other examples, the application server 110 provides an interface on the Worldwide Web (www) to access the mobile application for download and usage. Typically, upon receiving a user selection of the mobile application, an application package associated with the mobile application is downloaded on the mobile device associated with the user. The application package, when executed at the mobile device, results in installation process. Further, several components such as files, libraries, object codes, source codes etc. contained in the application package are stored on the mobile device 140 usually till the time the application is not uninstalled by the user. Also, the application package comprises components configured for communicating with the application server and other entities.

In some embodiments, the application server 110 also comprises modules for monitoring the real time usage and functioning of the mobile application installed on plurality of mobile devices 140.

The communication network 120 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 120 may be implemented as one of the different types of networks, such as intranet, local area network (LAN), wide area network (WAN), the internet, and the like. The communication network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. In one implementation, the communication network 115 is the internet which enables communication between the plurality of mobile devices 140, application servers 110 and the security server 130.

The security server 130 executes one or more software modules for implementing the framework for securing applications installed on the mobile device 140. In some examples, the security server 130 comprises real time monitoring module that is configured to check the status of the mobile application at every instance of its launch on the mobile device 140. In the event of detecting any abnormality, the real time monitoring module communicates the error log to one or more developers to take corrective action. The security server 130 further comprises an asset encryption module, a reflection module, an SSL pinning module, a content analyser module, a checksum module and the like. Further, the security server 130 is configured to execute one or more processes for performing functions such as de-compilation and recompilation of the application package.

In some embodiments, the asset encryption module is configured for retrieving the assets folder in the application package and encrypting one or more assets, classes, methods or variables stored therein. The one or more randomly selected classes, methods or fields are converted into a random string of predetermined length. Further, a random key generated by the asset encryption module is stored in the application package along with a plurality of pseudo-keys. The application package when recompiled and installed on a mobile device is decrypted only at run time using the keys stored in the application package. Since the encryption is performed at the security server 130, the security of the mobile application is enhanced.

The reflection module is configured to perform one or more modifications on the plurality of methods and class details retrieved from the application package. In some examples, the reflection module obfuscates the original class, method and variable identifiers in the source code randomly. In some other examples, the reflection module causes removal of method calls along with obfuscation of method names such that the methods are identified and called only during the run time. The reflection module, therefore enhances the security of the mobile application by preventing theft of source codes since any breach of the application would not reveal a logical source code.

The SSL pinning module further enhances the security of the application that prevents attacks on the application using mis-issued or fraudulent certificates. The SSL pinning module serves a list of public key hashes for trusted certificates to each of the one or more applications for a predefined time period. This ensures that any SSL request from the mobile application validates the server's certificate using the public keys thereby avoiding man in the middle (MITM) attacks wherein the mobile application is usually tweaked to trust a mis-issued or fraudulent certificate.

The security server 130 further comprises a content analyser module. In some embodiments, the content analyser module works in conjunction with the real time monitoring module to perform one or more of detecting run time environment, error logs, debuggers etc. In such embodiments, the content analyser module is configured to detect if the application installed on the mobile device 140 is run in an emulator or root environment. Further, the content analyser module also detects access to proxy servers or debuggers, if any, and searches for developer signature and source of application download. The content analyser module is further configured for communicating a log report of application run time use along with details of the environment to the developers at the application server 110. In response to the report, the developers may cause the application to be blocked on the mobile device instantly based on the threat level detected.

In some other embodiments, the content analyser module is configured to read the dependencies of one or more libraries in the application package and removes unused libraries from the source code to reduce vulnerability to attacks. Further, the content analyser module is also configured to remove the debug logs from the decompiled source code of the application package. Furthermore, the content analyser module is configured to disable one or more features of the application that are accessible by the mobile device 140. For example, the content analyser module blocks the mobile device 140 from taking screenshots of the contents of the application. Similarly, the content analyser module can be configured to prevent copy/paste of editable text fields in the application.

The security server 130 further comprises a malware detection module. The malware detection module is configured to scan the application package at runtime either periodically or continuously to identify malware, if any. In some examples, the malware detection module identifies malicious code based on signatures. In some other examples, the malware detection module identifies malicious content based on heuristics. Further, the malware detection module is configured to communicate the scan report to one or more developers at the application server 110 and the security server 130.

The security server 130 further comprises a checksum validator module. After adding multiple layers of security as described in the foregoing description, the checksum validator module generates a checksum string for the source code and stores the checksum string in application package before recompilation. During run time, the checksum validator module may ping the application on the mobile device 140 to detect any modification of the source code as it would result in validation failure and the checksum validator module communicates the alert to the security server 130 or the application server 110 to block the application from launching on the mobile device 140.

Figure 2:
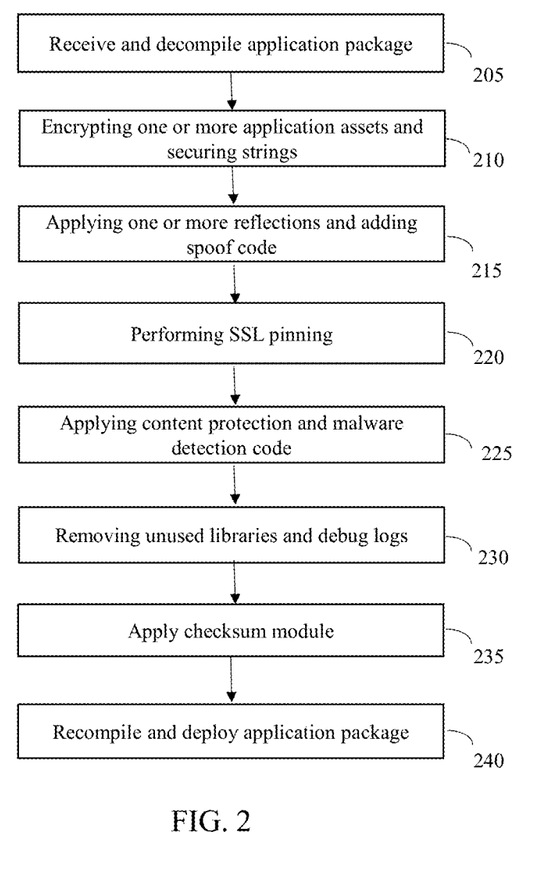
FIG. 2 depicts a control-flow of operation within the security framework, in accordance with an embodiment of the present disclosure.

Now referring to FIG. 2, the method implemented by the system 100 for enhancing the security of a software application installed on a mobile device 140, in accordance with embodiments of the present disclosure, is explained. The method begins at step 205 with receiving the application package of the mobile application from the application server 110 at the security server 130. The application package is, for example a proprietary file format for containing the application executables, libraries, dependencies, assets, methods, calls etc. such that when downloaded and executed on the mobile device 140, the application package delivers a useful application to the user. At step 205, the application package is decompiled and the various components of the application package including assets and asset directories are retrieved and stored at the security server 130.

At step 210, one or more assets in the application package are encrypted by the encryption module at the security server 130. In one implementation, the encryption module generates a random string to represent one or more methods, classes or fields contained in the source code such that the generated string is random and unique for each method and field. Further, the encryption module generates a random encryption key of predetermined length at the security server 130. The key along with a plurality of pseudo keys is stored in the application package prior to recompiling such that the decryption can take place only during run time on the mobile device 140. In another implementation, the encryption module is further configured for watermarking one or more method, class or other fields so as to render it unreadable. The encryption protocol is implemented using RSA, AES or other such algorithms.

At step 215, the method reflection module relies on the attributes of the computer program to introspect and modify its own structure and behaviour at runtime. Specifically, the method calls for the one or more methods retrieved in the application package are removed in addition to obfuscating the original class, methods and variables in the source code at each compilation of the application package. Removal of method calls by reflection module prevents unauthorised calling and execution during run time.

At step 220, the SSL pinning module implements measures for improving communication security of the application when installed on the mobile device 140. Specifically, each of the one or more applications installed on the mobile device 140 communicate with one or more entities via the communication network 120 including but not limited to the security server 130, the application server 110 or any other third party servers. Often, security lapses during communication with such servers is leveraged to cause MITM attacks. The SSL pinning module stores a list of public key hashes for trusted certificates in the application package for a predefined time period. This ensures that any SSL request from the mobile application validates the server's certificate using the public keys thereby avoiding man in the middle (MITM) attacks.

At step 225, the content analyser module in conjunction with the malware detection module perform one or more functions to further enhance the security of the mobile application. The one or more functions include but are not limited to adding functions for blocking screenshot utility of the mobile device 140, adding functions for disabling copy, paste of editable content from the application, adding spoof code, scanning the decompiled application package for any malware signatures, storing the source and developer signature etc. It is to be noted that the content analyser module and the malware detection module are also configured to continuously monitor the application after installation on the mobile device 140, as is described in other sections of this document.

At step 230, removing unused libraries and content such as images are removed. Further, debug logs in the decompiled application package are removed so as to prevent understanding the flow of the application while running the application in debug mode.

At step 235, an additional security measure is implemented by the security server 130 to prevent tampering of the application during run time on the mobile device 140. After performing the series of steps 205-230, the checksum validator module of the security server 130 generates a checksum string prior to recompilation of the secure application package. Further, the checksum validator module periodically validates the application by comparing the stored checksum with the runtime value. Any modification of the application package would result in validation failure thus resulting in blocking the application.

At step 240, the now secured application package is recompiled and pushed to the mobile device 140 for installation of the application executable. In another embodiment, the recompiled secure application package is communicated to the application server 110 for distribution and deployment on plurality of mobile devices.

Figure 3:
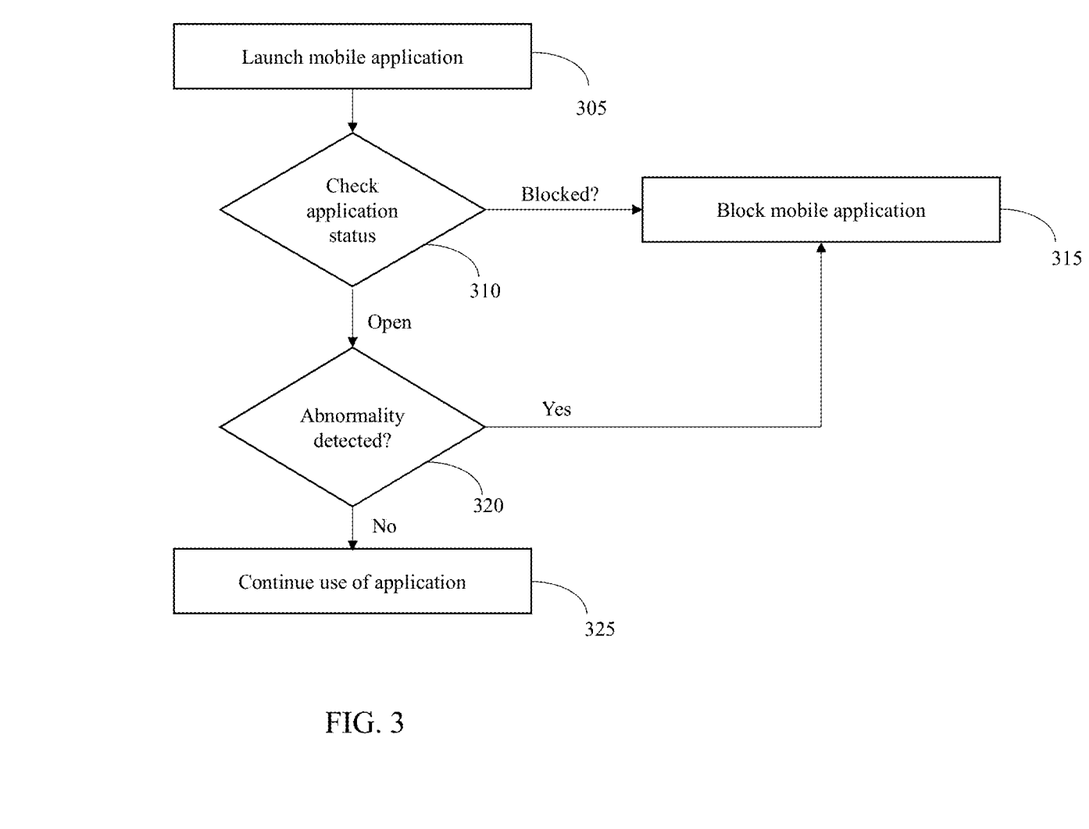
FIG. 3 depicts another control-flow of operation within the security framework, in accordance with an embodiment of the present disclosure.

Now referring to FIG. 3, the real time monitoring of the application installed on mobile device 140 is disclosed, in accordance with embodiments of the present disclosure. While the one or more modules of the security server 130 are configured for adding multiple layers of security to the application package before the application is installed on the mobile device 140, it is also necessary to maintain the security of the application during runtime since the applications are inherently programmed to communicate with several entities such as third party servers during usage on the mobile device 140.

The real time monitoring of the application installed on the mobile device 140 begins at step 305 and is automatically triggered when the application is launched on the mobile device 140. Typically, the application is launched when a user of the mobile device 140 such as a smartphone taps on the icon of the application displayed on the smartphone screen. At step 310, the application status is checked based on one or more layers of security added to the application package before the application was installed. For instance, the application in communication with the security server 130 is checked for successful decryption, checksum validation etc. In the event of failure, the application is blocked instantaneously as shown in step 315. However, if the application opens successfully, then during the runtime of the application, continuous monitoring is performed by the one or more modules at the security server 130, for example the content analyser module. For instance, during runtime the environment is continuously monitored for rooting, emulation, debugging etc. In the event of detecting any such abnormal conditions, the application is blocked instantaneously, otherwise the user continues to use the application as shown in step 325. In some examples, a notification is communicated to the user of the application, such as 'Application use not allowed in debug environment', upon detecting abnormal conditions. Similarly, a log of such events is communicated to the application developer at the application server 110.

Figure 4:
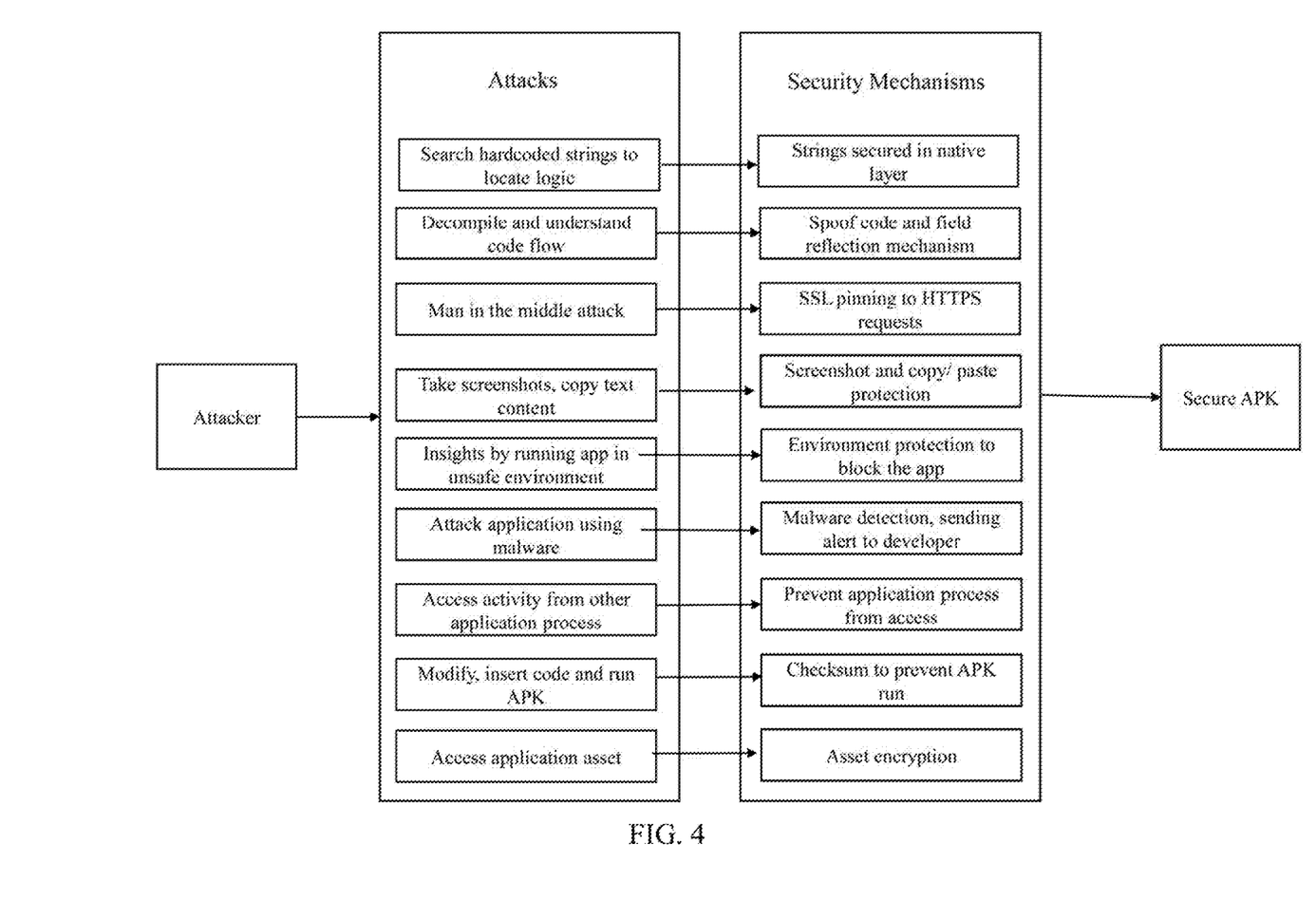
FIG. 4 depicts a pictorial-description of outcome with respect to the security framework, in accordance with an embodiment of the present disclosure.

FIG. 4 is a representation of the one or more possible threats to an application installed on the mobile device and the one or more security measures implemented by the embodiments of the present disclosure to secure the application. For instance, to prevent attacks on the application to decode the logic, encryption of the source code strings is performed. Similarly, to prevent MITM attacks—SSL pinning of the http requests is performed.

As is evident from the foregoing description, a framework for enhancing the security and reducing piracy, data theft in applications installed on a mobile device is provided. The system and methods of present disclosure are advantageous in that a multi-layer security enhancement is achieved to secure each of the one or more components of the application package including but not limited to the source code, libraries, methods, calls, user data etc. In contrast with the prior art solutions, the present disclosure teaches methods for securing the application both before deployment as well as during run time on a mobile device. Further, the system and methods of the present application are advantageous during the testing phase of application development and are capable for securing the application package against different types of cyber threats including but not limited to hacking, cracking, malware, code theft etc.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The scope of embodiments is by no means limited by these specific examples. Numerous variations, whether explicitly given in the specification or not, such as differences in structure, dimension, and use of material, are possible.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature.

We claim:

1. A method for securing an application package of a mobile application, the method comprising:
   receiving, by a security server, the application package configured to be installed on a mobile device;
   decompiling, by the security server, the application package, wherein the application package comprises one or more software components;
   encrypting, by the security server, at least one software component from among the one or more software components;
   storing, by the security server, an encryption key along with a plurality of pseudo-keys and strings in lower layers of the application package;
   removing, by the security server, one or more unused libraries and debug logs from the application package;
   modifying, by the security server, one or more method calls in a source code of the application package, wherein the modification includes removal of the one or more method calls along with obfuscation of method names such that methods associated with the method names are identified and called only during run time of the mobile application in the mobile device;
   performing, by the security server, SSL pinning in the application package;
   calculating and storing, by the security server, a checksum in the application package, and
   recompiling and deploying, by the security server, the secured application package.

2. The method as claimed in claim 1, wherein the secured application package when installed on the mobile device is further monitored for one or more of successful decryption, checksum validation, runtime environment and malware detection.

3. The method as claimed in claim 2, wherein the decryption is performed by the mobile application installed on the mobile device during run time using the encryption key, the plurality of pseudo-keys and the strings stored in the lower layers of the secured application package.

4. The method as claimed in claim 2, wherein at least one action is performed upon detecting one of a checksum validation failure, a decryption failure, abnormal runtime conditions or malware detection.

5. The method as claimed in claim 1, wherein modifying the one or more method calls further comprises one or more steps of:
   i. randomly obfuscating one or more original class, methods or variables in the source code; and
   ii. adding spoof code to the source code.

6. The method as claimed in claim 1, wherein performing the SSL pinning comprises the step of adding one or more trusted certificates in the application package, wherein the one or more trusted certificates are used for validating communication with third party entities.

7. The method as claimed in claim 1, wherein the at least one software component is an asset contained in the application package.

8. The method as claimed in claim 1, wherein the application package is secured prior to distribution through a platform.

9. A system for securing an application package of a mobile application, the system comprising:
   an application server configured for publishing and distributing the mobile application;
   a mobile device configured for providing a runtime environment for installing and using the mobile application, and
   a security server configured for receiving the application package, decompiling the application package, securing the application package, and recompiling the application package,
   wherein the security server comprises:
      an asset encryption module configured for:
         encrypting at least one software component from among one or more software components of the application package; and
         storing an encryption key along with a plurality of pseudo-keys and strings in lower layers of the application package;
      a content analyser module configured for removing one or more unused libraries and debug logs from the application package;
      a reflection module configured for modifying one or more method calls in a source code of the application package, wherein the modification includes at least removal of the one or more method calls along with obfuscation of method names such that methods associated with the method names are identified and called only during run time of the mobile application in the mobile device;
      a SSL pinning module configured for performing SSL pinning in the application package; and
      a checksum validator module configured for calculating and storing a checksum in the application package.

10. The system as claimed in claim 9, wherein the security server is configured for modifying at least one method and method call in a source code of the mobile application to be installed on the mobile device, by randomly obfuscating one or more original class, methods or variables in the source code, and/or by adding spoof code to the source code.

11. The system as claimed in claim 9, wherein the security server is configured for continuously monitoring the runtime environment of the mobile device after the mobile application is installed on the mobile device.

12. The system as claimed in claim 9, wherein the security server is configured for continuously monitoring the mobile application installed on the mobile device for detecting malware.

* * * * *